United States Patent Office 3,708,492
Patented Jan. 2, 1973

3,708,492
IMIDAZOLYL PROSTAGLANDIN COMPOUNDS
Alejandro Zaffaroni, Atherton, Calif., assignor to
Alza Corporation
No Drawing. Filed Sept. 23, 1970, Ser. No. 74,875
Int. Cl. C07d 49/36
U.S. Cl. 260—309        15 Claims

ABSTRACT OF THE DISCLOSURE

Compounds of the formulae:

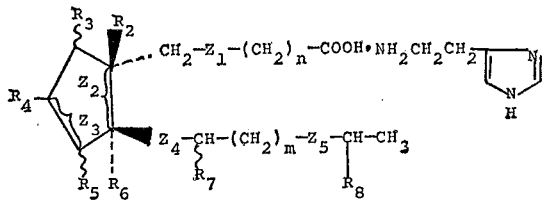

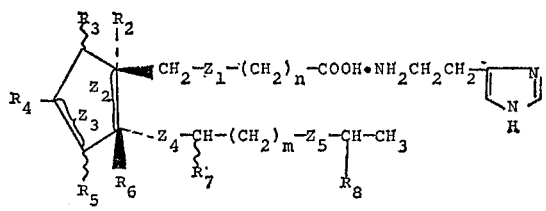

wherein $R_2$ and $R_6$ are hydrogen when $Z_2$ is a single bond and $R_2$ and $R_6$ are absent when $Z_2$ is a double bond; $R_3$ is keto,

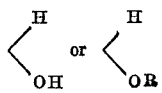

$R_4$ is hydrogen or

$R_5$ is hydrogen,

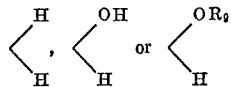

$R_7$ is hydroxyl or $OR_9$; $R_8$ is hydrogen or hydroxyl; $R_9$ is an acyl or an alkoxyalkyl; $Z_1$ is —$CH_2CH_2$— or cis —CH=CH—; $Z_2$ is a single bond or a double bond; $Z_3$ is a single bond when $R_4$ is

and $R_5$ is

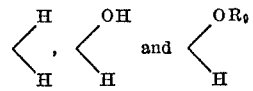

and $Z_3$ is a double bond when $R_4$ and $R_5$ are hydrogen; $Z_4$ is —$CH_2CH_2$— or trans —CH=CH—; $Z_5$ is —$CH_2CH_2$— or cis —CH=CH—; and wherein $n$ is 2 to 5 and $m$ is 1 to 3. The new imidazolyl prostaglandin compounds have improved biological stability and they can serve as a reservoir for the prostaglandins per se that have biological activities such as stimulating or inhibiting smooth muscles, inhibiting gastric secretion, lowering or raising blood pressure, inhibiting lipolysis and inhibiting platelet aggregation.

BACKGROUND OF THE INVENTION

The present invention concerns new and useful compounds related to the prostaglandins. More particularly, the invention pertains to novel imidazolyl prostaglandin compounds that possess enhanced biological stability, and the property to perform as a pharmaceutical storage depot for eventual in vivo circulation to prostaglandin receptive sites, whereupon the subsequent metabolic separation of the imidazolyl prostaglandin to release the parent prostaglandin, the valuable pharmacological properties of the released prostaglandin are made available for performing its respective physiological function. The new compounds of this invention have the structure as illustrated by the ionic-type generic structure as shown in Formulae I which formulae is the functional equivalent of the conventional ionic-type structure set forth in the accompanying claims. Formulae I is as follows:

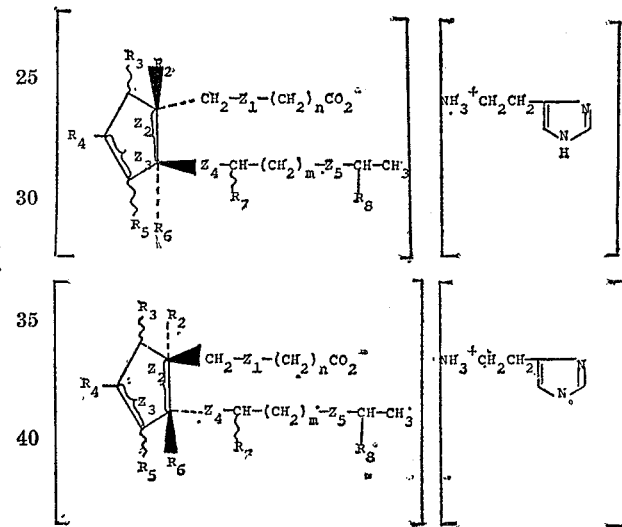

FORMULAE I wherein $R_2$ and $R_6$ are hydrogen with the proviso that $Z_2$ is a single bond and $R_2$ and $R_6$ are absent when $Z_2$ is a double bond; $R_3$ is a member selected from the group consisting of keto,

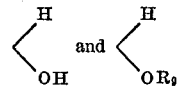

$R_4$ is selected from the group consisting of hydrogen and

$R_5$ is selected from the group consisting of hydrogen,

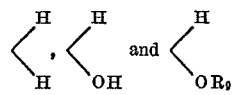

$R_7$ is selected from the group consisting of hydroxyl and $OR_9$; $R_8$ is selected from the group consisting of hydrogen and hydroxyl; $R_9$ is selected from the group consisting of acyl and alkoxyalkyl; $Z_1$ is selected from the group consisting of saturated carbon carbon bond —$CH_2CH_2$— and a cis unsaturated carbon carbon double bond —CH=CH—; $Z_2$ is selected from the group consisting of a single covalent bond and a double covalent bond and $Z_2$ is a single bond when $R_2$ and $R_6$ are hydrogen and it is a double bond when $R_2$ and $R_6$ are absent; $Z_3$ is a single bond when $R_4$ is

and $R_5$ is

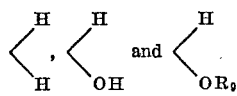

and it is a double bond when $R_4$ and $R_5$ are hydrogen; $Z_4$ is selected from the group consisting of a saturated carbon carbon bond —$CH_2CH_2$— and a trans unsaturated carbon carbon bond —CH=CH—; $Z_5$ is selected from the group consisting of a saturated carbon carbon bond —$CH_2CH_2$— and a cis unsaturated —CH=CH—; and wherein $n$ is 2 to 5 and $m$ is 1 to 3. The wavy line in the formula indicates the stereochemistry of the attached group on the cyclopentyl ring or on the side chain and it indicates either an $\alpha$ or $\beta$ configuration. The dotted line indicates that the attached group are $\alpha$ oriented or on the same side of the cyclopentyl ring as the carboxyl side chain and a wedged line indicates that the $\beta$-substituents are oriented on the same side of the ring as the alkyl side chain. The wavy line on the alkyl side chain indicates that the attached group may have a configuration represented by the terms sinister (S) and rectus (R) which for these compounds are equivalent nomenclature of $\alpha$ and $\beta$ respectively.

The novel and the unobvious imidazolyl prostaglandin compounds of the invention as embraced by Formulae I are primarily related to the prostaglandins, a family of naturally occurring endogenous biologically important compounds possessing diverse and valuable pharmacological properties. The prostaglandins, a family of lipid acids are characterized as being 20 carbon prostanoic derivatives and they are usually separated into categories including prostaglandins of the E, F, A and B series. The separation of the groups depends on the presence or absence of double bonds, hydroxyl and ketone groups, for example the E-type prostaglandins have an 11$\alpha$-hydroxyl group and a 9-keto group in the five-membered cyclopentyl ring while in the F-type prostaglandins the 9-position is substituted with an $\alpha$-hydroxyl group and the compound still retains the 11-hydroxyl group. The A-type and B-type prostaglandins do not have the familiar 11-hydroxyl group that is present in the E's and F's but they are dehydrated derivatives of the compounds. The prostaglandins are also classified as primary, secondary and tertiary depending on the number of double bonds present in the prostaglandin. For example, the primary prostaglandins containing a 13:14 double bond are called $E_1$ and $F_1$. The prostaglandins that contain an additional double bond at the 5:6 position are designated as $E_2$ and $F_2$ and the prostaglandins with an added third double bond positioned at 17:18 are termed $E_3$ and $F_3$ respectively, including the classification also used for the various categories.

The valuable properties known by the art to be possessed by the prostaglandin family includes the ability to modify the activity of alimentary and reproductive smooth muscles, the ability to block acid mucous and enzyme secretions by the stomach, the property to stimulate the synthesis of adrenal corticoids, to modify blood pressure, lipolysis, and to possibly serve as a mediator of hormonal functions. While the family as a group possesses these actions, the actions of each of the E, F, A and B prostaglandins are often quantitatively dissimilar and sometimes they are opposed. For example, the prostaglandins of the E-type configuration are vasodepressors and they also decrease the motility of the uterus at ovulation while the prostaglandins of the F- type in certain species, have the opposite effects. Prostaglandin $E_1$ also uniquely inhibits platelet aggregation while the F-prostaglandins are devoid of this property. The prostaglandins of the A-type structure are like the E-type with respect to their vascular smooth muscle action but they possess a differing degree of relative potency as antilepolytic gastrointestinal secretion regulating agents.

Even though the prostaglandins are known to possess the above mentioned valuable pharmacological utilities in vitro that could selectively be used to modify the activity of various glands, tissues and organs, the potential pharmaceutical utilization of these compounds has not been presently realized in vivo because the prostaglandins lack the necessary biological stability that lends itself to therapeutic application of the prostaglandins. For example, the prostaglandins on systemic administration rapidly undergo reduction of double bonds, dehydrogenation and $\beta$-oxidation with formation of compounds possessing less pharmacological activity. In addition, the known biologically active prostaglandin E-type chemical structures in the presence of acidic conditions readily change to prostaglandins of the A-type structure that possess different biological activities. These prostaglandins that are known by the art to evidence widely different biological activities which make their physiological application seemingly more difficult and sometimes unpredictable in the face of the possible in vivo changes in chemical structure and physiological activities. These structural changes also lessen the availability of useful prostaglandin for in vivo use by changing useful prostaglandins that can be absorbed from the vascular system to inactive metabolic forms of the prostaglandins.

In the light of the above presentation, it will be appreciated by those versed in the art that a critical need exists for increasing the biological stability of the prostaglandin family while essentially maintaining and readily making available the prostaglandins to their biological receptors. It will also be appreciated that a need exists for providing prostaglandin compounds that can act as a biological reservoir for prostaglandins for subsequent availability and vascular circulation of the prostaglandin to cells, glands and tissues for their immediate physiological use while simultaneously increasing the biological stability of the prostaglandin.

Accordingly, it is an immediate object of the present invention to make available to the art novel and unobvious prostaglandin compounds that overcome the problems often associated with the prior art.

Yet another object of the present invention is to provide new prostaglandin compounds that possess enhanced biological stability against rapid metabolism to permit manifestation of their known pharmacological properties following administration in vivo.

Still yet another purpose of the subject invention is to provide prostaglandin compounds that can act as both an intracellular and extracellular biological reservoir of the parent prostaglandin for circulating within the vascular system to ensure increased availabilitty of the prostaglandins as needed by the cells, glands and tissues for their immediate use.

Yet still another object of the invention is to provide prostaglandin compounds that possess enhance cell membrane permeability in certain hosts for improvement of intracellular prostaglandin performance.

These and other features, objects and advantages of the present invention will become more readily apparent from the following detailed description of the invention taken in conjunction with the accompanying claims.

SUMMARY OF THE INVENTION

The present invention concerns novel imidazolyl prostaglandin compounds that are characterized by unobvious and desirable properties such as an improved biological stability, the property of the novel imidazolyl prostaglandin to act as a reservoir in the vascular system for circulation to a prostaglandin receptive biological site, where following the metabolic release of the parent prostaglandin from the imidazolyl prostaglandin the valuable physiological properties of the released prostaglandin are made available to the site, and the novel compounds are also useful for membrane permeability studies in certain laboratory animals.

DESCRIPTION OF THE INVENTION

The novel imidazolyl compounds of the invention as illustrated by Formulae I are prepared by reacting a prostaglandin of the compounds of Formulae II:

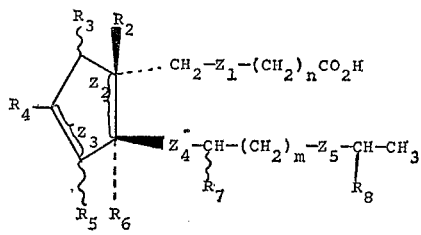

and

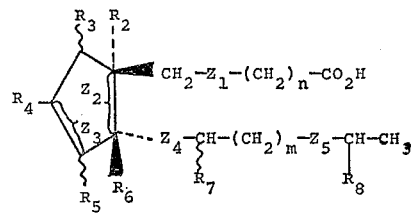

FORMULAE II wherein $R_2$ and $R_6$ are hydrogen when $Z_2$ is a single bond, and $R_2$ and $R_6$ are absent when $Z_2$ is a double bond; $R_3$ is a keto group,

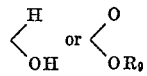

$R_4$ is hydrogen or

$R_5$ is hydrogen,

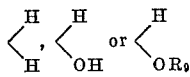

$R_6$ is as defined above; $R_7$ is hydroxyl or $OR_9$; $R_8$ is hydrogen or hydroxyl; $R_9$ is an acyl moiety derived from a hydrocarbon carboxylic acid of 1 to 18 carbon atoms or an α-loweralkoxylower alkyl; $Z_1$ is a saturated carbon carbon bond —$CH_2CH_2$— or a cis unsaturated carbon carbon bond —CH=CH—; $Z_2$ is a single or a double bond with the proviso as set forth immediately above; $Z_3$ is a double bond when $R_4$ and $R_5$ are hydrogen, and $Z_3$ is a single bond when $R_4$ and $R_5$ are substituted with two groups; $Z_4$ is a saturated carbon carbon bond —$CH_2CH_2$— or a trans unsaturated carbon carbon bond —CH=CH—; $Z_5$ is a saturated carbon carbon bond —$CH_2CH_2$— or a cis unsaturated —CH=CH—; n is 2 to 5 and m is 1 to 3. The wavy line in the formula indicates the stereochemistry of the attached substituents on the cycloalkyl ring or on the side chain may have either an α or a β configuration. The dotted line indicates that the attached groups are α-oriented or on the same side of the cyclopentyl ring or the carboxyl side chain and the wedged line indicates that the β-substituents are oriented on the same side of the ring as the alkyl side chain. The wavy line on the alkyl side chain indicates that the attached groups may have a configuration represented by the terms sinister (S) and rectus (R) which for these compounds are equivalent nomenclature of α and β; with an imidazolyl of Formula III:

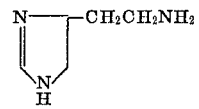

FORMULA III

Generally, the reaction of the prostaglandin and the imidazolyl for preparing the prostaglandin imidazolyl compound is carried out in the presence of a suitable inert solvent with mixing of stoichiometric amounts of the reactants at room temperature or in a warmed solvent and gradually mixing the reacting ingredients until all the ingredients are in solution. The novel product is obtained by chilling the resulting mixture to precipitate the crystals, or the product can be isolated by the addition of a miscible diluent of low polarity, or by standard evaporation techniques. The obtained crystals, amorphous or powders are filtered, washed and dried, usually in a desiccator over a drying agent, to a constant weight.

The starting materials used herein to synthesize the novel compounds of Formulae I are prepared in known ways or they are readily obtained from commercial sources. The reacting materials of Formulae II are easily prepared in art known ways either by isolating the prostaglandin from natural sources, for example, the vesicular glands of sheep, or by the enzymatic conversion from fatty acid substrates such as arachidonic acid, and depending on the substituents desired, routinely chemically transforming double bonds to single bonds by hydrogenation, converting keto groups to hydroxymethylene groups by reduction, by dehydrating to introduce double bonds, by forming carbinol derivatives by treating a carbo(lower)alkoxy group with an alkali metal alumino hydride reducing agent such as lithium aluminum hydride and the like. Specific prior art methods that set forth the procedures useful to provide all of the compounds of Formulae II are found in Science, vol. 158, pages 382 to 391, 1967; Recueil, vol. 85, pages 1233 to 1250, 1966; Biochem. Biophys. Acta., vol. 106, pages 215 to 217, 1965, Agnew. Chem. Inter. Ed., vol. 4, pages 410 to 416, 1965; Experientia, vol. 21, pages 113 to 176, 1965; Recueil, vol. 85, pages 1251 to 1253, 1966 and other art recorded procedures.

The prostaglandin compounds depicted by Formulae II can also be chemically synthesized by well-known methods, for example, from 2-oxobicyclo-(3.3.0)oct-6-en-3-one as described in Tetrahedron Letters, vol. 4, pp. 311 to 313, 1970; by the hydrogenation of 11,15-bis(tetrahydropyranyl) ether of 9α,11α,15(S)-trihydroxy-5-cis,13-trans-prostadenoic acid over Pd/C followed by hydrolysis and treatment with Jones reagent to give the resulting prostaglandin as reported in J. Am. Chem. Soc., vol. 92, pp. 2586 to 2587, 1970; by the acid-catalyzed opening and rearrangement of epoxybicyclo-(3.1.0)-hexane as described in J. Am. Chem. Soc., vol. 91, pp. 5364 to 5371, 1969; by the reduction of 9-oxo and 15-oxo prostaglandin derivatives to give the R and S isomers of the corresponding hydroxyls and the dehydration of 11-hydroxy-9-oxoprostanoic acid to give the ketones as recorded in J. Org. Chem., vol. 34, pp. 3552 to 3557, 1969; and J. Lipid Research, vol. 10, pp. 320–325, 1969; as prepared by reduction of 2-oxo-3-oxo - 6-exo-(trans-3-(S)hydroxyhept-1-enyl)-endo-7-acetoxy-cis-bicyclo(3.3.0)octane followed by reduction and treatment with Wittig reagent to give the corresponding protaglandin as in J. Am. Chem. Soc., vol. 91, pp. 5675 to 5677, 1969; and other reported chemical synthesis embracing compounds within Formulae II such as J. Am. Chem. Soc., vol. 92, pp. 937 to 938, 1970; J. Am. Chem. Soc., vol. 91, pp. 5675 to 5677, 1969; Tetrahedran Letters, vol. 5, pp. 465 to 470; 1966; The Proceedings of the Robert A. Welch Foundation Conference on Chemical Research, vol. XII, pp. 51 to 79, 1969; Chem. Abst., vol. 66, p.

75770; and Tetrahedron Letters, No. 59, pp. 5185–5188, 1969.

Representative of the alkanoyl moieties are the alkanoyl groups containing 1 to 18 carbon atoms such as formyl, acetyl, propionyl, butyryl, isovaleryl, valery, hexanoyl, caproy, octanoyl, heptanoy, auroyl, palmitoyl, stearol, nonanyl, oleoyl and the ike. Exemplary of $\alpha$-alkoxyalkyl groups embraced with $R_9$ is the group

wherein $R_{11}$ is an alkyl group of 1 to 7 carbon atoms inclusive, such as the straight or branched chain akyl groups methyl, ethyl, n-propyl, iso-propyl, n-butyl, tert-butyl, pentyl, neopenty, n-hexyl, isohexy and the like. The group $R_{12}$ is hydrogen or the lower akyls of 1 to 7 carbon atoms as just set forth.

Compounds that are suitable for the purpose of the invention that are represented by Formulae II with their usual names based on art recognized prostanoic acid nomenclature and followed by the presently used abbreviations are the compounds 11$\alpha$,15(S)-dihydroxy-9-oxo-13-trans-prostenoic acid, (PGE$_1$); 11$\beta$,15(IR)-dihydroxy-9-oxo-13-trans-prostenoic acid, (11,15-epi-PGE$_1$); its antipodes, ent-11,15-epi-PGE$_1$; 11$\alpha$,15(S)-dihydroxy-9-oxo-5-cis, 13-trans-prostadienoic acid, (PGE$_2$); 11$\alpha$,15(S)-dihydroxy - 9 - oxo - 5 - cis,13-trans, 17-cis-prostatrienoic acid, (PGE$_3$); 15(S) - hydroxy-9-oxo-13,13-trans-prostadienoic acid, (PGA$_1$); 15(S)-hydroxy-9-oxo-5-cis,10,13-trans-prostatrienoic acid, (PGA$_2$); 9$\alpha$,11$\alpha$,15(S)-trihydroxy-13-trans-prostenoic acid, (PGF$_{1\alpha}$). 9$\beta$,11$\alpha$,15(S)-trihydroxy-13-trans-prostenoic acid, (PGE$_{1\beta}$); 9$\beta$,11$\beta$,15(R)-trihydroxy-13-trans-prostenoic acid, (11,15-epi-PGF$_{1\beta}$); its antipode, ent-11,15-epi-PGF$_{1\beta}$; 9$\alpha$,11$\alpha$,15(S)-trihydroxy-5-cis, 13-trans-prostadienoic acid, (PGF$_{2\alpha}$); 9$\beta$,11$\alpha$,15(S)-trihydroxy-5-cis,13-trans-prostadienoic acid, (PGF$_{2\beta}$); 9$\alpha$,11$\alpha$,15(S)-trihydroxy-5-cis,13-trans,17-cis-prostatrienoic acid, (PGF$_{3\alpha}$); 9$\beta$,11$\alpha$,15(S)-trihydroxy-5-cis,13-trans-17-cis-prostatrienoic acid, (PGF$_{3\beta}$); 15(S)-hydroxy-9-oxo 8(12),13-trans-prostadienoic acid, (PGB$_1$); 15(S)-hydroxy - 9 - oxo - 5-cis,8(12),13-trans-prostatrienoic acid, (PGB$_2$); 15(S),19-dihydroxy-9-oxo-8(12),13-trans-prostadienoic acid, (19-hydroxy PGB$_1$); 15(S),19-hydroxy-9-oxo-10,13-trans-prostadienoic acid, (19-hydroxy PGA$_1$); 15(S)-hydroxy-9-oxo-8(12)-prostanoic acid, (dihydro PGB$_1$); and the like.

The $\beta$-(4-imidazolyl)ethylamine starting material of Formula III, also known as 4-imidazolethylamine, histamine, $\beta$-aminoethylglyoxaline, ergamine and ergotidine, occurs widely in nature and it is found in animal tissues and blood, bacterial end-products, in putrefying materials and the like. The imidazolyl can be obtained from commercially available sources or it can be manufactured by the decarboxylation of histidine in high-boiling inert solvents such as fluorene, or by bacterial enzymes as in Ann. Inst. Pasteur, vol. 61, pp. 828–835, 1938. The imidazolyl can also be synthesized from acetondicarboxylic acid with nitrosation to diisonitrosoacetone followed by reduction to give diaminoacetone. Condensation with potassium thiocyanate, diazotization of the resulting 2-mercapto-4-aminomethylimidazole with simultaneous removal of the thiol group and conversion of 4-hydroxymethyimidazole to $\beta$-(4-imidazolyl) ethylamine by a nitrite synthesis completes the sequence. The synthesis of $\beta$-(4-imidazoly)ethylamine are reported in J. Am. Chem. Soc., vol. 40, pp. 1716 to 1726, 1918; J. Chem. Soc., vol. 99, pp. 668 to 675, 1911; and J. Am. Chem. Soc., vol 71, pp 3976 to 3977, 1949. The aza groups of the imidazolyl ring are seen as possessing low reaction characteristics for reacting with the prostaglandin compounds as attributed to the low basic nature of the aza groups. The aza groups are believed to have the low basicity because of the presence of paired electrons that enter into a resonance type structure with the imidazolyl ring's double bonds to form a six pi electron system that is essentially aromatic in scope. This system favors the formation of an ionic bond between the alkylamino side chain and the prostaglandin compound. The particular starting compounds utilized in practicing the instant invention do not form a part of the invention and the starting compounds are well documented in the scientific literature as cited supra and the like.

The solvents suitable for the purposes of the present invention include the more polar type of solvents such as tetrahydrofuran, chloroform, acetone, methylene chloride, ethylene chloride, dioxane, isobutyl ketone, methyl isobutyl ketone, dimethyl ether, diethyl ether, alkanols such as methanol, methyl butanol, n-amyl alcohol, 2-ethyl hexyl acohol, ethylene glycol, ethanol, isopropanol, hexanol, butanol, pentanol and lesser polar solvents such as benzene, carbon tetrachoride, cycloalkanes such as cyclopentane, 1,2-dimethycyclopentane, cyclooctane, isopropylcyclohexane, cyclohexane, and methylcyclohexane; alkanes such as 3-methypentane, m-hexane, n-heptane and the like.

The following examples are given simply to illustrate this invention, but they are not in any way to be construed as limiting the scope of the invention as these and other means for performing the invention will be obvious to those versed in the art in the light of this disclosure.

EXAMPLE 1

To a room temperature solution of 11$\alpha$,15(S)-dihydroxy-9-oxo-13-trans-prostenoic acid (0.355 gram, 0.001 mole) in 100 milliliters of dry methylene chloride there is added 2-(4-imidazolyl)-ethylamine, 0.112 gram, 0.001 mole. The mixture is heated to about 35° C. and cooled to room temperature. Then, 200 milliters of petroleum ether is added and the resulting mixture is chilled in an ice bath. The solids are filtered, washed with petroleum ether and suspended in warm dry petroleum ether. Petroleum ether is added until turbidity develops and the mixture is chilled overnight. The crystals are filtered, washed with petroleum ether and dried in a desiccator over concentrated sulfuric acid to a constant weight, to give 2-(4-imidazolyl)-ethylamine 11$\alpha$,15(S)-dihydroxy-9-oxo-13-trans-prostenoate.

EXAMPLE 2

To a room temperature 30 ml. solution of ethanol containing 0.352 gram, 0.001 mole of 11$\alpha$,15(S)-dihydroxy-9-oxo-5-cis-13-trans-prostadienoic acid is added with constant stirring a 30 ml. of warmed, methanol solution of 2 - (4 - imidazolyl) - ethylamine, 0.112 gram, 0.001 mole. Next, the solution is evaporated under vacuum and the resulting product is triturated with ether-benzene mixtures and the product 2-(4-imidazolyl)-ethylamine 11$\alpha$,15(S)-dihydroxy-9-oxo-5-cis-13-trans-prostadienoate dried in a desiccator over concentrated sulfuric acid.

EXAMPLE 3

The procedure of Example 2 is employed in this example by reacting stoichiometrically equivalent amounts of 9$\alpha$,11$\alpha$,15(S)-trihydroxy - 13 - trans-prostenoic acid with 2-(4-imidazolyl)-ethylamine in methylene chloride with constant stirring at room temperature. After the solution is evaporated under light vacuum, the product 2-(4-imidazolyl)-ethylamine 9$\alpha$,11$\alpha$,15(S)-trihydroxy-13-trans-prostenoate is triturated with dry cyclohexane, and the product is filtered, washed with benzene and finally it is dried in a desiccator over concentrated sulfuric acid to a constant weight.

EXAMPLE 4

The synthesis of 2-(4-imidazolyl)-ethylamine 9$\alpha$,11$\alpha$,15(S)-trihydroxy-5-cis, 13-trans-prostadienoate is carried out by first adding to a room temperature 50 ml. tetrahydrofuran solution containing 0.708 gram, 0.002 mole of 9$\alpha$,11$\alpha$,15(S)-trihydroxy-5-cis-13-trans-prostadienoic acid to a 50 ml. tetrahydrofuran solution containing 0.222 gram, 0.002 mole of 2-(4-imidazolyl)-ethylamine with constant stirring until the mixing of the two solutions is complete. Next, the mixed solution is warmed to about 50° C. to 55° C. for ½ to ¾ hours to ensure essentially complete formation of the desired product. Then the solution is cooled to room temperature and the solvent evaporated with the resulting product triturated with dry benzene. Finally, the product is filtered, washed with a little benzene and dried in a vacuum desiccator to constant weight.

Other novel compounds that are readily prepared according to the spirit of the invention are for example, 2-(4-imidazolyl)-ethylamine 11α,15(S)-dihydroxy-9-oxo-5-cis-13-trans,17-cis-prostatrienoate;

2-(4-imidazolyl)-ethylamine 15(S)-hydroxy-9-oxo-10,13-trans-prostadienoate;

2-(4-imidazolyl)-ethylamine 9β,11α,15(S)-trihydroxy-13-trans-prostenoate;

2-(4-imidazolyl)-ethylamine 9β,11α,15(S)-trihydroxy-5-cis,13-trans-prostadienoate;

2-(4-imidazolyl)-ethylamine 9α,11α,15(S)-trihydroxy-5-cis,13-trans,17-cis-prostatrienoate;

2-(4-imidazolyl)-ethylamine 9β,11α,15(S)-trihydroxy-5-cis,13-trans-17-cis-prostatrienoate;

2-(4-imidazolyl)-ethylamine 15(S)-hydroxy-9-oxo-8-(12),13-trans-prostadienoate;

2-(4-imidazolyl)-ethylamine 15(S)-hydroxy-9-oxo-5-cis,8-(12),13-trans-prostatrienoate;

2-(4-imidazolyl)-ethylamine 15(S),19-dihydroxy-9-oxo-8-(12),13-trans-prostadienoate;

2-(4-imidazolyl)-ethylamine 15(S),19-dihydroxy-9-oxo-10,13-trans-prostadienoate;

2-4-imidazolyl)-ethylamine 11α,15(S)-dihydroxy-9-oxo-prostanoate;

2-(4-imidazolyl)-ethylamine 15(S)-hydroxy-9-oxo-8(12)-prostanoate;

2-(4-imidazolyl)-ethylamine 15(S)-trihydroxy-9-oxo-5-cis,10,13-trans-prostatrienoate;

2-(4-imidazolyl)-ethylamine 9α,11α,15(S)-trihydroxy-5-cis,13-trans-prostadienoate;

and the like.

This invention in making available to the art the novel above described imidazolyl prostaglandins that are presently believed to possess unobvious and improved properties not suggested by the prior art such as enhanced stability towards biological conditions, the ability to act as a reservoir and thereby to serve as a source of the compound when the imidazolyl prostaglandin compound is circulated by the vascular system to glands, tissues, cells and the like, where in contact with the cellular membranes they may enter the cell for subsequent metabolic hydrolysis of the imidazolyl prostaglandin to release the prostaglandin moiety and make it available at the needed biological site. In addition, the compounds possess valuable properties that make them important for laboratory studies including topical absorption, cellular diffusion experiments, and the like.

The novel compounds of the invention can be used by the pharmaceutical and the veterinary arts in a variety of pharmaceutical preparations or veterinary preparations. In these preparations, the new compounds are administrable in the form of tablets, pills, powders, capsules, injectables, solutions, suppositories, emulsions, dispersions, food premix and in other suitable forms. The pharmaceutical or veterinary preparation which contains the compound is conveniently admixed with a nontoxic pharmaceutical organic carrier or a non-toxic pharmaceutical inorganic carrier. Typical of pharmaceutically acceptable carriers, are for example, water, gelatine, lactose, starches, magnesium stearate, talc, vegetable oils, polyalkylene glycols, petroleum jelly and other conventionally employed pharmaceutically acceptable carrier. The pharmaceutical preparation may also contain non-toxic auxiliary substances such as emulsifying, preserving, wetting agents and the like, as for example sorbitan monolaurate, tri- ethanolamine oleate, polyoxyethylene sorbitan monopalmityl, dioctyl sodium sulfosuccinate, and the like.

Exemplary of a typical method for preparing a tablet containing the active ingredient is to first suitably comminute the active ingredient with a diluent such as starch, sucrose, kaolin or the like to form a powder mixture. Next, the just prepared mixture can be granulated by wetting with a non-toxic binder such as a solution of gelatin, acacia mucilage, corn syrup and the like and after mixing the composition is screened to any predetermined particle sieve size. As an alternative, if preferred, to granulation, the just prepared mixture can be slugged through conventional tablet machines and the slugs comminuted before the fabrication of the tablets. The freshly prepared tablets can be coated or they can be left uncoated. Representative of suitable coatings are the non-toxic coatings including shellac, methylcellulose, Carnuba wax, styrene-maleic acid copolymers and the like. For oral administration, compressed tablets containing 0.1 milligram to 5 milligrams calculated as the free acid of the prostaglandins are manufactured in the light of the above disclosure and by art known fabrications techniques well know to the art and set forth in Remington's Pharmaceutical Science, Chapter 39, Mack Publishing Co., 1965.

The manufacture of capsules for oral use consists essentially of mixing the active compounds with a non-toxic carrier and enclosing the mixture in a gelatin sheath. The capsules can be in the art known soft form of a capsule made by enclosing the compound in intimate dispersion within an edible oil or the capsule can be a hard capsule consisting essentially of the novel compound mixed with a non-toxic solid such as talc, calcium stearate, calcium carbonate or the like.

The daily dose administered for the compounds will of course vary with the particular novel compound employed because of the varying potency of the compounds, the chosen route of administration and the size of the recipient. The dosage administered is not subject to definite bounds, but it will usually be an effective amount of the pharmacologically active free acid form produced upon the metabolic reelase of the prostaglandin to achieve the biological function of the prostalglandin. Representative of a typical method for administering the imidazolyl prostaglandin compounds is by the injectable-type administration route. By this route, a sterile solution containing the imidazolyl prostaglandin compound is administered intravenously at the rate of 0.01 microgram to 0.15 microgram per minute per kilogram of body weight by means of an infusion pump, at the rate of 10 to 15 milliliter per hour. For example, the compound 2-(4-imidazolyl)-ethylamine 9α,11α,15(S)-trihydroxy-13-trans-prostenoate can be administered by this route for producing stimulation of smooth muscles. The compound is administered by the injectable route in a form suited for injection, such as mixed with sterile physiological saline, or in aqueous solutions having incorporated therein an agent that delays absorption such as aluminum monostearate and the like.

Suitable topical preparations can easily be prepared by, for example, mixing 500 mg. of an imidazolyl prostaglandin with 15 g. of cetyl alcohol, 1 g. of sodium lauryl sulfate, 40 g. of liquid silicone D.C. 200, Dow Corning Co., Midland, Mich., 43 g. of sterile water, 0.25 g. of methylparaben and 0.15 g. of propylparaben and warming the mixture with constant stirring to about 75° C. and then permitting the preparation to congeal. The preparation acn be readily applied to the skin by inunction or it can be applied topically by dispensing the preparation from a conventional surgical gauze dispenser, and the like. Suitable procedures for preparing topical applications are set forth in Remington's Pharmaceutical Science, Chapter 37, as cited supra.

The compounds of this invention can also be conveniently administered in aerosol dosage form. An aerosol form can be described as a self-contained sprayable product in which the propellant force is supplied by a liquified gas. For administering a self-propelled dosage form of about 100 mg. to 500 mg. that is used about 3 or 4 times daily for inhalation therapy, the bronchodialator 2-(4-imidazolyl)-ethylamine 11α,15(S)-dihydroxy-9-oxo-5-cis,13-trans-prostadienoate is suspended in an inert non-toxic propellant in a commercially available compressed-gas aerosol container. Suitable propellants include trichloromonofluoromethane, dichlorodifuluoromethane, dichloromonofluoromethane, dichlorodifluoromethane, dichlorodifluorethane, monochlorodifluoroethane and mixtures thereof. The inert gas can also be mixed with non-toxic cosolvents such as ethenol, if desired, to produce the aerosol form. If the compound is administered by oral inhalation employing conventional nebulizers, it is convenient to dilute in an aqueous solution about 1 part of the imidazolyl protaglandin with about 200 to 300 parts of solution, for administering 3 or 4 times per day.

For administering to valuable domestic animals or for administering to laboratory animals for scientific studies, the imidazolyl prostaglandin is administered in the form of a food premix, such as mixing with dried fish meal, oatmeal and the like, and then the prepared premix is added to the regular feed, thereby administering the compound to the domestic or laboratory animal in the form of feed.

The above examples and disclosure are set forth merely for illustrating the mode and the manner of the invention and various modifications and embodiments can be made by those skilled in the art in the light of the invention without departing from the spirit of the invention.

I claim:
1. A compound selected from the group of compounds of the formulae:

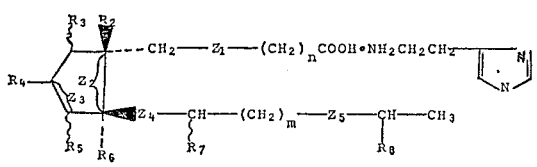

wherein $R_2$ and $R_6$ are hydrogen when $Z_2$ is a single bond; $R_3$ is keto or

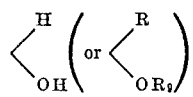

$R_4$ is hydrogen or

$R_5$ is hydrogen,

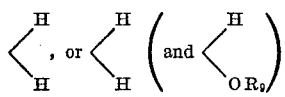

$R_7$ is hydroxy; $R_8$ is hydrogen or hydroxyl; $Z_1$ is

or cis —CH=CH—; $Z_2$ is a single bond with the proviso that $R_4$ is

and $R_5$ is

or is a double bond with the proviso that $R_3$ is keto and $R_4$ is

and $R_5$ is

$Z_3$ is a single bond or a double bond and it is a single bond when $Z_2$ is a double bond and a double bond with the proviso that $R_3$ is keto and $R_4$ and $R_5$ are hydrogen; $Z_4$ is —CH$_2$CH$_2$— or trans —CH=CH—; $Z_5$ is

or cis —CH=CH—; $n$ is 3; and $m$ is 1 and wherein the hydroxyl group bonded to the cyclopentyl ring have an alpha configuration and when bonded to the alkyl side chain have a sinister configuration.

2. A compound according to claim 1 wherein the compound is 2-(4-imidazolyl)-ethylamine 11α,15(S)-dihydroxy-9-oxo-13-trans-prostenoate.

3. A compound according to claim 1 wherein the compound is 2-(4-imidazolyl)-ethylamine 11α,15(S)-dihydroxy-9-oxo-5-cis,13-trans-prostadienoate.

4. A compound according to claim 1 wherein the compound is 2-(4-imidazolyl)-ethylamine 9α,11α,15(S)-trihydroxy-13-trans-prostenoate.

5. A compound according to claim 1, wherein the compound is 2-(4-imidazolyl)-ethylamine 11α,15(S)-dihydroxy-9-oxo-5-cis,13-trans,17-cis-prostatrienoate.

6. A compound according to claim 1 wherein the compound is 2-(4-imidazolyl)-ethylamine 15(S)-hydroxy-9-oxo-10,13-trans-prostadienoate.

7. A compound according to claim 1 wherein the compound is 2-(4-imidazolyl)-ethylamine 15(S)-hydroxy-9-oxo-5-cis,10,13-trans-prostatrienoate.

8. A compound according to claim 1 wherein the compound is 2-(4-imidazolyl)-ethylamine 9α,11α,15(S)-trihydroxy-5-cis,13-trans-prostadienoate.

9. A compound according to claim 1 wherein the compound is 2-(4-imidazolyl)-ethylamine 9α,11α,15(S)-trihydroxy-5-cis,13-trans-17-cis-prostatrienoate.

10. A compound according to claim 1 wherein the compound is 2-(4-imidazolyl)-ethylamine 15(S)-hydroxy-9-oxo-8(12),13-trans-prostadienoate.

11. A compound according to claim 1 wherein the compound is 2-(4-imidazolyl)-ethylamine 15(S)-hydroxy-9-oxo-5-cis,8(12),13-trans-prostatrienoate.

12. A compound according to claim 1 wherein the compound is 2-(4-imidazolyl)-ethylamine 15(S),19-dihydroxy-9-oxo-8(12),13-trans-prostadienoate.

13. A compound according to claim 1 wherein the compound is 2-(4-imidazolyl)-ethylamine 15(S),19-dihydroxy-9-oxo-10,13-trans-prostadienoate.

14. A compound according to claim 1 wherein the compound is 2-(4-imidazolyl)-ethylamine 11α,15(S)-dihydroxy-9-oxo-prostanoate.

15. A compound according to claim 1 wherein the compound is 2-(4-imidazolyl)-ethylamine 15(S)-hydroxy-9-oxo-8(12)-prostanoate.

References Cited

UNITED STATES PATENTS 3,524,867  8/1970  Beal et al. _____ 260—468 D

FOREIGN PATENTS 1,097,533  1/1968  Great Britain _____ 260—468 D

OTHER REFERENCES

Laity et al.: J. Pharm. Pharmacol., 1970, vol. 22, p. 384, (May 1970), RS1.J5.

NATALIE TROUSOF, Primary Examiner

U.S. Cl. X.R.

260—468 R; 424—273

UNITED STATES PATENT OFFICE
CERTIFICATE OF CORRECTION

Patent No. 3,708,492          Dated January 2, 1973

Inventor(s) Alejandro Zaffaroni

It is certified that error appears in the above-identified patent and that said Letters Patent are hereby corrected as shown below:

Column 7, line 7, "ike" should read --like--; Column 7, line 24, "(IR)" should read --(R)--; Column 7, line 33, "(PGE$_{1\beta}$)" should read --(PGF$_{1\beta}$)--; Column 8, line 19, "3-methypentane" should read --$\beta$-3-methylpentane--; Column 11, lines 10 & 11, "chloromonofluoromethane" and "dichlorodifluoromethane" are not in the spec.

Signed and sealed this 21st day of May 1974.

(SEAL)
Attest:

EDWARD M. FLETCHER, JR.  
Attesting Officer

C. MARSHALL DANN  
Commissioner of Patents